United States Patent [19]

Swersey

[11] Patent Number: 4,793,428

[45] Date of Patent: Dec. 27, 1988

[54] HOSPITAL BED WITH AN INTEGRATED SCALE

[75] Inventor: Burt L. Swersey, Scarsdale, N.Y.

[73] Assignee: Cobe Asdt, Inc., Elmsford, N.Y.

[21] Appl. No.: 162,038

[22] Filed: Feb. 29, 1988

[51] Int. Cl.$^4$ .................. G01G 19/52; A47C 21/00
[52] U.S. Cl. ............................. 177/144; 5/508
[58] Field of Search ......................... 177/144; 5/508

[56] References Cited

U.S. PATENT DOCUMENTS

| 4,023,633 | 5/1977 | Swersey et al. | 177/144 |
| 4,281,730 | 8/1981 | Swersey et al. | 177/144 |
| 4,551,882 | 11/1985 | Swersey et al. | 177/DIG. 9 |
| 4,584,989 | 4/1986 | Stith | 177/144 X |

Primary Examiner—George H. Miller, Jr.
Attorney, Agent, or Firm—Kenyon & Kenyon

[57] ABSTRACT

The hospital bed is provided with a scale assembly which is incorporated into the bed between the bed support frame and patient supporting section. The links which connect the patient support section to the bed support frame are connected to the load frame of the scale assembly so that weighing may occur in any position of the patient support section. The scale assembly is connected to the transverse beams of the bed support frame in a depending manner via bolts. Linear variable differential transformers are used to obtain read-out signals for the displacement of the load frame as a measure of the weight on the load frame.

16 Claims, 6 Drawing Sheets

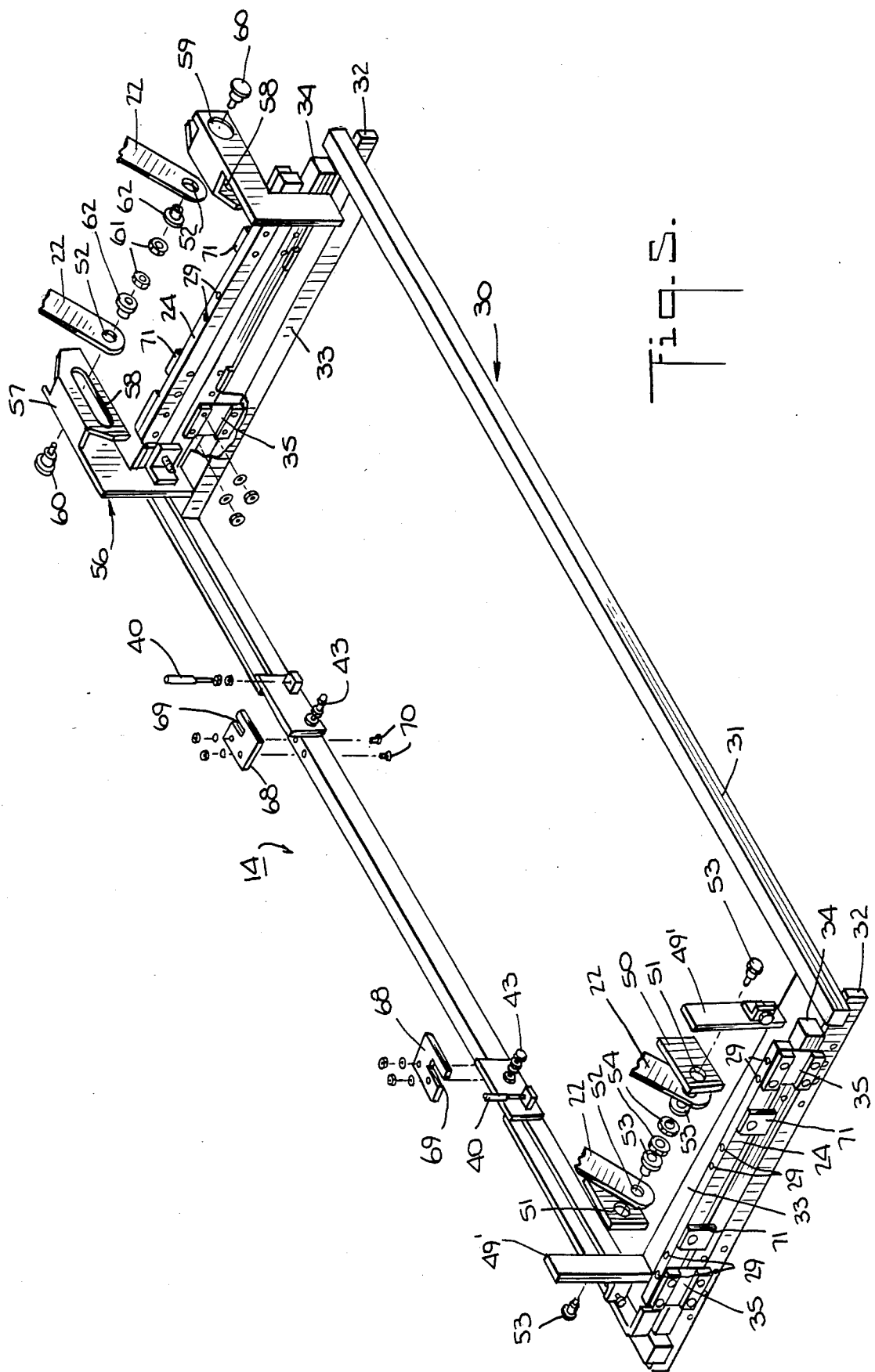

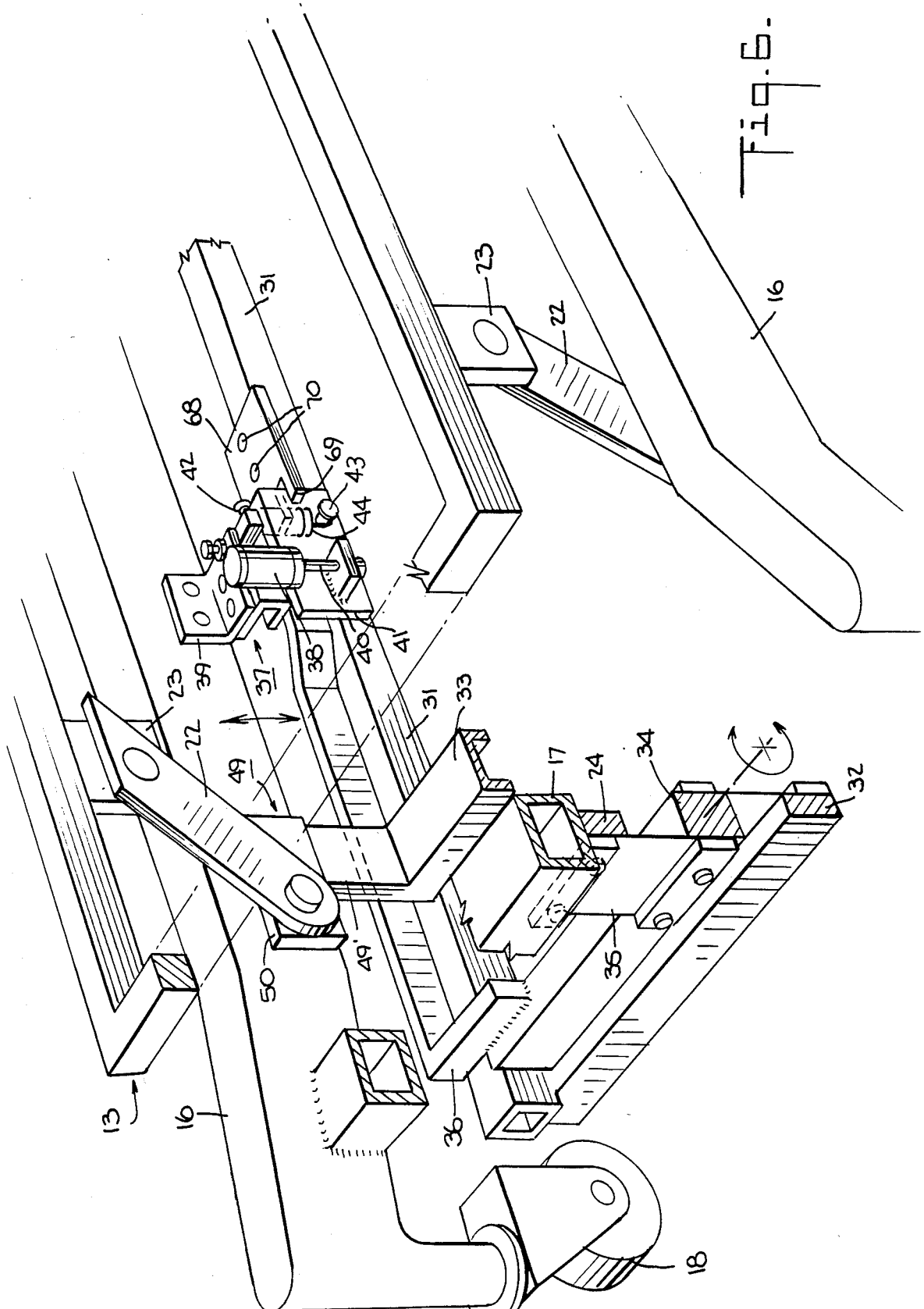

HOSPITAL BED WITH AN INTEGRATED SCALE

This invention relates to a hospital bed with an integrated scale. More particularly, this invention relates to a hospital bed with a movable patient support section having a scale incorporated therein.

As is known, various types of scales have been used for the weighing of bed-ridden patients. In some cases, scales have been incorporated into the construction of a hospital bed in order to obtain the weight of a patient or a variation in weight of a patient over a period of time. For example, some of these scales have employed load cell arrangements which require lowering of a patient support section of the bed onto load cells which are mounted on a separate support frame in order to perform a weighing operation. Further, the lowering operation requires a levelling of the patient support section as well as some type of separation of the patient support section from the support frame in order to transfer the load of the support section onto the cells to obtain a correct weight of the patient.

It has also been known to provide scales, such as described in U.S. Pat. No. 4,281,730, onto which a hospital bed can be rolled to obtain the weight or variation in weight of a bed-ridden patient. While such scales are effective and relatively inexpensive, manual pushing of a bed onto and off the scale has been required.

Other scales have been known, such as described in U.S. Pat. No. 4,487,276, which can be slid into place between a bed-ridden patient and a mattress in order to weigh the patient. Again, while such scales have been effective for the purposes intended, the scales require transportation to and from a bed in order to weigh a patient.

Still other scales have been known, such as described in U.S. Pat. No. 4,023,633 which can be incorporated into the base of a patient-occupied structure, such as a reclining chair, in order to obtain a weight and/or variation in weight of a patient.

Accordingly, it is an object of the invention to provide a hospital bed with an integrated scale in a cost-effective manner.

It is another object of the invention to incorporate a scale into an existing hospital bed in a low-cost manner.

It is another object of the invention to incorporate a scale into a hospital bed without interfering with normal bed functions.

It is another object of the invention to provide a hospital bed with a scale which can be used in any position of a patient support section of the bed to obtain a weight reading.

Briefly, the invention provides a hospital bed having a bed support frame and a patient support section which is movable relative to the support frame with a scale assembly which is mounted on the support frame between the support frame and the patient support section for weighing the patient support section with a bed-ridden patient thereon in any position of the patient support section relative to the support frame.

The bed is also provided with means for moving the patient support section relative to the bed support frame which includes, for example, a parallelogram arrangement of links for vertically moving the patient support section. In addition, the links are arranged to permit pivoting of one end of the patient support section, i.e. the foot section, relative to the opposite end. This latter feature permits the foot of the patient support section to be lowered relative to the head of the section.

The scale assembly is constructed in a manner similar to that described in U.S. Pat. No. 4,281,730. In this respect, the scale of assembly includes a pair of support bars, a load frame which is movably mounted relative to the support bars, a displacement transmitting member connected between each support bar and the load frame via pairs of flexures and a beam arm which is connected to each displacement transmitting member in cantilevered manner. In addition, the scale assembly includes a signal emitting means, such as a linear variable differential transformer, for emitting a signal corresponding to the movement of each beam arm connected to a displacement transmitting member.

In accordance with the invention, the support bars of the scale are mounted on the bed support frame so as to depend the scale assembly within the support frame while the patient support section is mounted on the load frame via the links. In addition, each transformer has a core mounted on a beam arm and a coil mounted on the bed support frame about the core for emitting a signal therefrom.

As is known, a conventional hospital bed, for example, a Hill-Rom Model 835 bed usually has a parallelogram arrangement of links pivotally mounted on four upstanding brackets on a bed support frame. In accordance with this invention, these four brackets are removed and the scale assembly is integrated between the links at these points and the bed support frame. To this end, the scale assembly includes modified brackets to pivotally receive the respective links. For example, one pair of brackets at the head end of the bed is provided with apertures to receive the forward set of links in pivotal manner. On the other hand, the pair of brackets at the foot of the bed are of L-shape with each having a horizontally disposed inverted U-shaped arm with a horizontally disposed slot in one depending leg of the arm to receive a link therein in similar manner to the known construction. In addition, an aperture is provided in the second depending leg of the U-shaped arm to permit access to a bolt passing through the slot for connecting a link to the L-shaped bracket.

These and other objects and advantages of the invention will become more apparent from the following detailed description taken in conjunction with the accompanying drawings wherein:

FIG. 5 illustrates a perspective view of the scale assembly in accordance with the invention; and FIG. 6 illustrates a partial view of one end of the scale assembly integrated in the bed in accordance with the invention.

Figure 1:
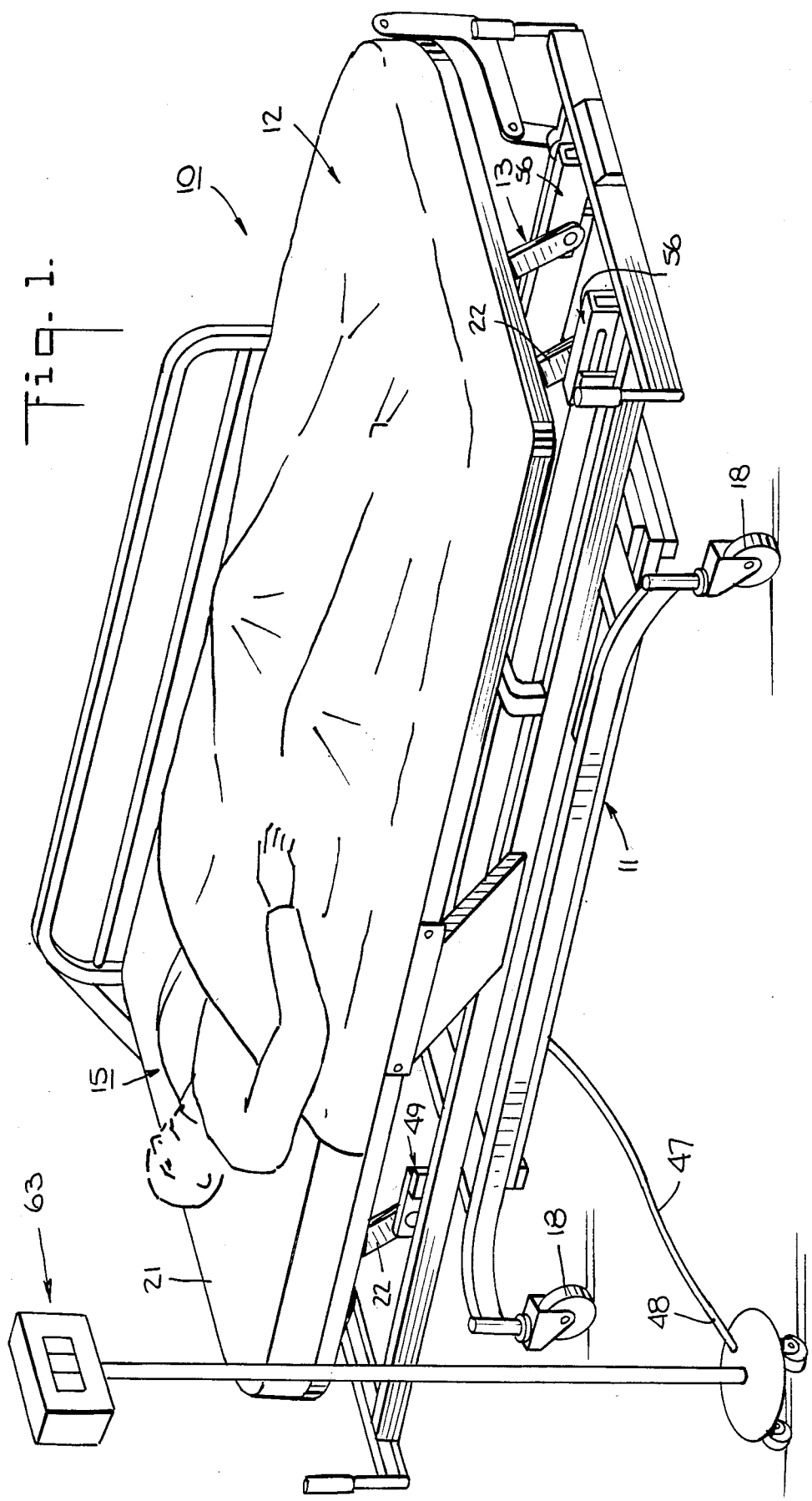
FIG. 1 illustrates a perspective view of a hospital bed having an integrated scale assembly therein in accordance with the invention.

Referring to FIG. 1, the hospital bed 10 is constructed in a generally conventional manner with a bed support frame 11 and a patient support section 12 which is movable relative to the support frame 11 via suitable mean including a linkage system 13 into various positions as is known. In addition, the bed 10 is provided with an integrated scale assembly 14 which is mounted on the support frame 11 for weighing the patient support section 12 with a bed-ridden patient 15 thereon in any position of the support section 12 relative to the support frame 11.

Figure 4:
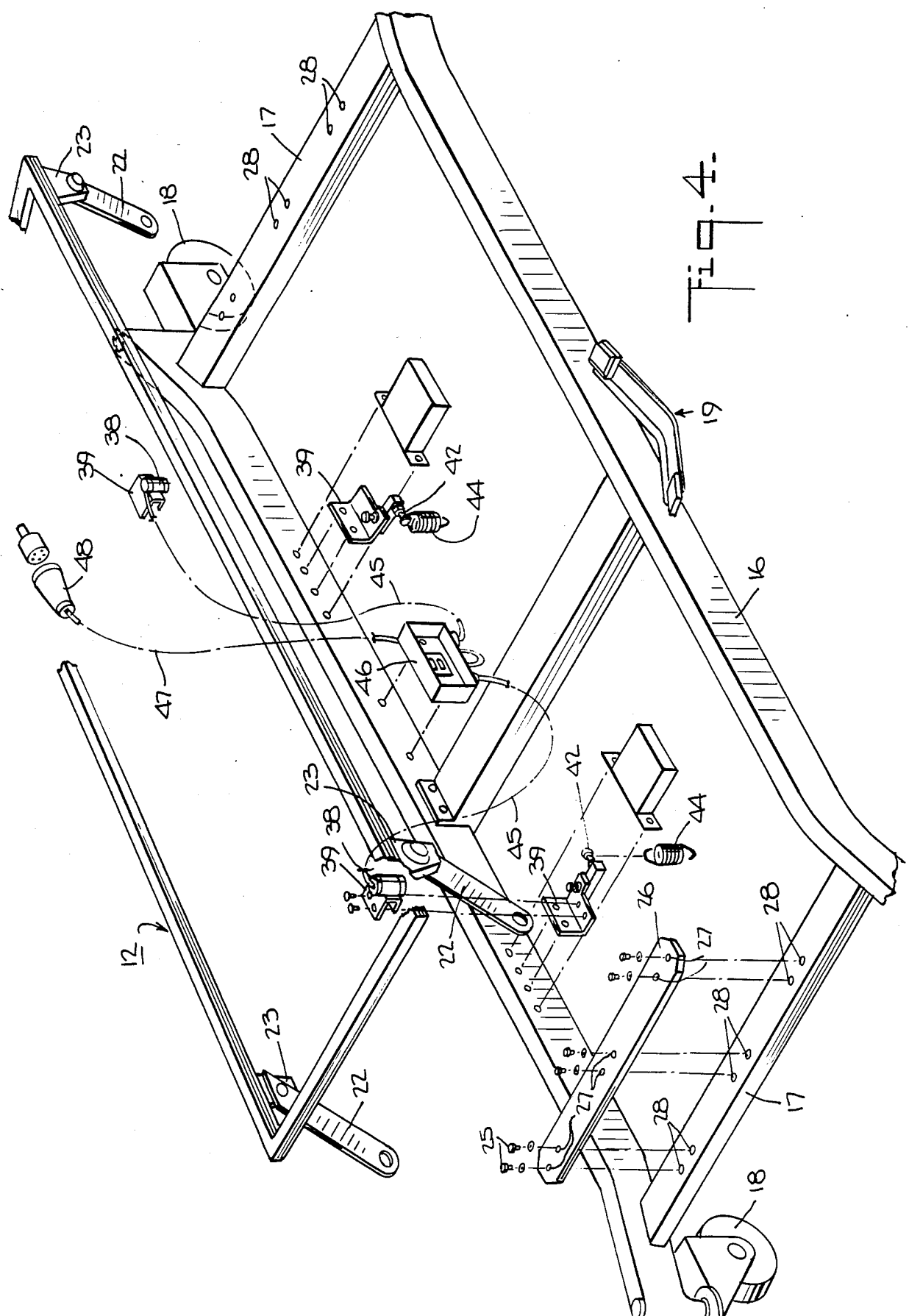
FIG. 4 illustrates an exploded view of the bed support frame and patient support section with a transformer of the scale assembly mounted therein.

Referring to FIG. 4, the support frame 11 is of generally known construction For example, the support frame 11 has a rectangular frame formed of longitudinal beams 16 and transverse beams 17 mounted on four wheels or casters 18 at respective corners. A locking assembly 19 is also provided for locking the wheels 18, as is known.

The patient support section 12 is likewise of generally known construction and includes a rectangular frame 20 which is sized to support a mattress 21 (see FIG. 1) thereon.

As indicated in FIG. 4, the linkage system 13 for moving the patient support section 12 relative to the bed support frame 11 includes a parallelogram arrangement of links 22, i.e. four links, for vertically moving the patient support section 12 relative to the support frame 11. A suitable motor (not shown) is also provided to effect the actual movement of the patient support section 12 relative to the bed support frame 11. As indicated in FIG. 4, each link 22 is pivotally connected at the upper end to a depending bracket 23 on the frame 20 of the patient support section 12. The lower end of each link 22 is connected to the scale assembly 14 in a manner as described below.

Figure 2:
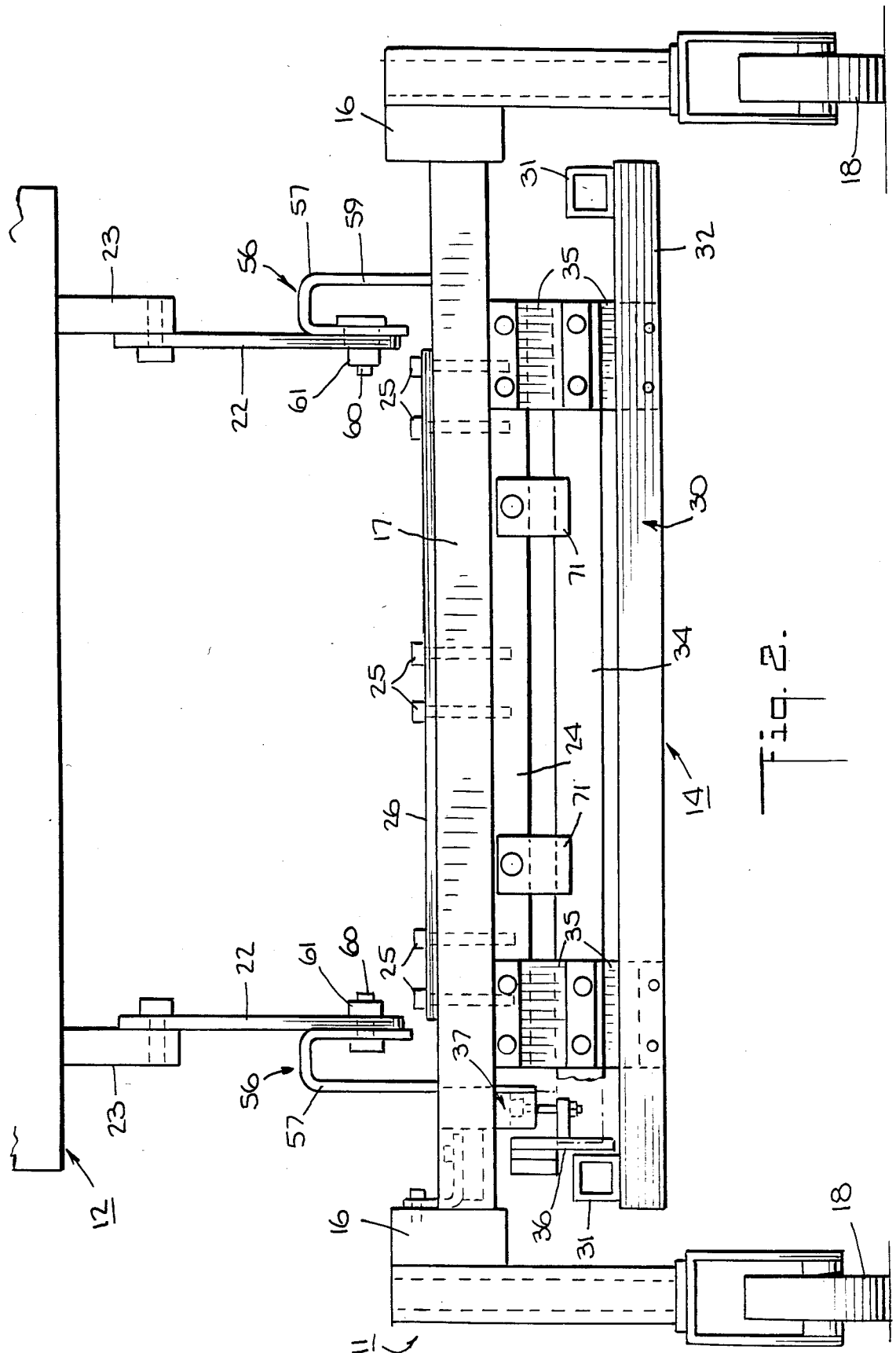
FIG. 2 illustrates a partial end view of the scale assembly incorporated into the bed in accordance with the invention.

Referring to FIG. 5, the scale assembly 14 is constructed in a manner similar to that of the scale described in U.S. Pat. No. 4,281,730. For example, the scale assembly 14 includes a pair of parallel bars 24, each of which is secured via a plurality of bolts 25 (see FIG. 2) to the underside of a transverse beam 17 of the bed support frame 12. As indicated in FIGS. 2 and 4, a plate 26 is disposed on the top side of each transverse beam 17 to facilitate the mounting of a respective bar 24 on the bed support frame 11. In addition, apertures 27 are provided in each plate 26 and apertures 28 are provided in each transverse beam 17 to accommodate the bolts 25, while each bar 24 is provided with threaded bores 29 (see FIG. 5) to receive the bolts 25.

The scale assembly 14 also includes a load frame 30 of rectangular shape formed by a pair of parallel longitudinally disposed rails 31 and a pair of transverse bars 32. In addition, the load frame 30 includes a pair of transverse beams 33 (see FIG. 5) which are connected to and between the rails 31 at the respective ends of the load frame 30.

The scale assembly 14 also includes a pair of displacement transmitting members in the form of bars 34 each of which is connected between a support bar 24 and a load bar 32 via pairs of flexures 35 in a manner as is known.

Referring to FIG. 6, a beam arm 36 is connected to each displacement bar 34 in a cantilevered manner at one end. Each beam arm 36, in turn, cooperates with a signal emitting means 37 which serves to emit a signal corresponding to the movement of the beam arm 36.

Figure 3:
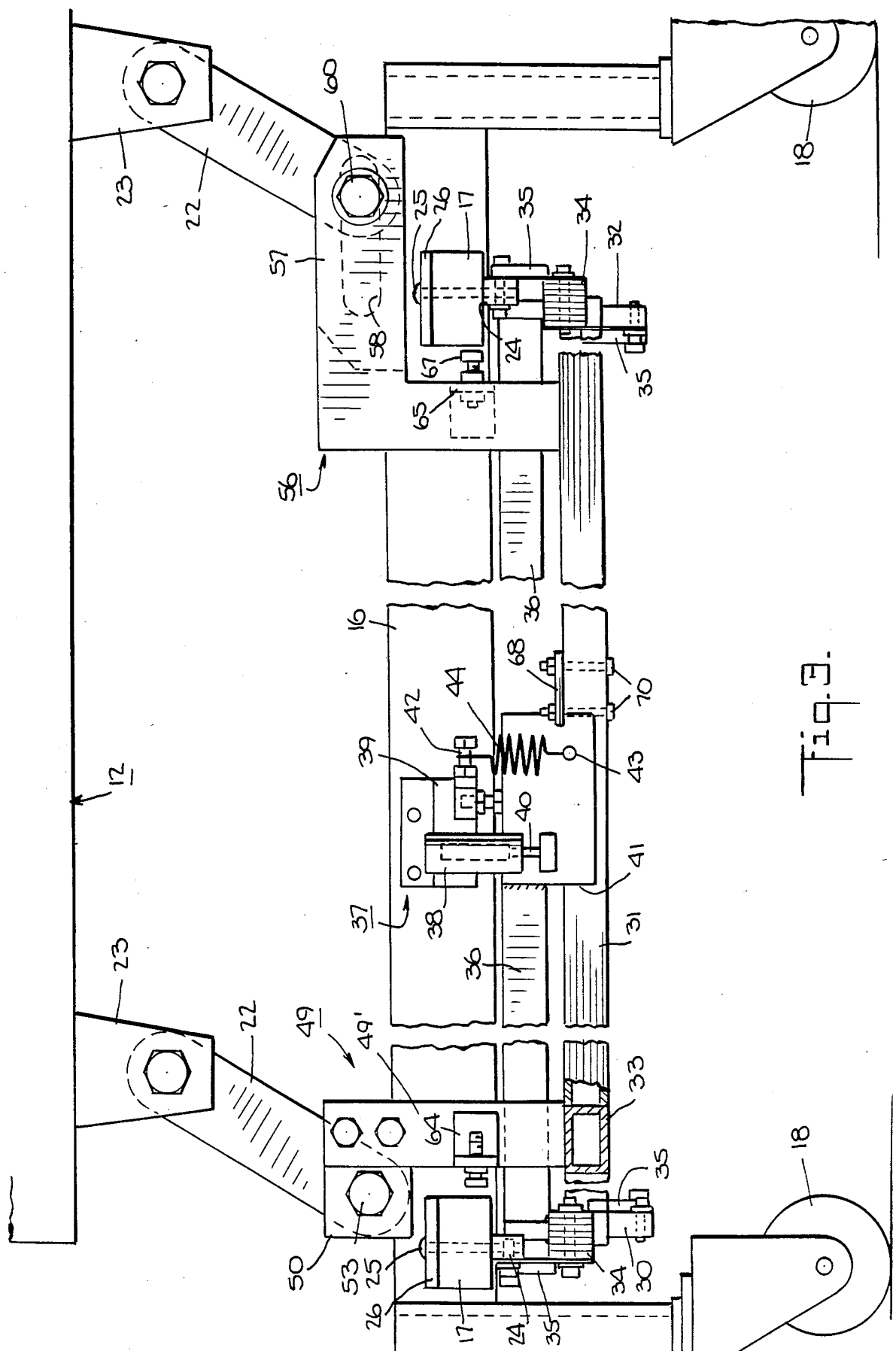
FIG. 3 illustrates a side view of the scale assembly within the bed in accordance with the invention.

Referring to FIGS. 3 and 6, each signal emitting means 37 is in the form of a linear variable differential transformer having a coil 38 mounted in fixed relation via a suitable bracket assembly 39 to a longitudinal beam 16 of the bed support frame 11 as well as a core 40 which is fixedly mounted on a beam arm 36 via a bracket assembly 41. As indicated, the transformer coil bracket assembly 39 carries an outstanding pin 42 while the core bracket assembly 41 carries an outstanding pin 43 between which a compression spring 44 is mounted. The springs 44 serve to provide a neutral point for the beam arms 36 as well as supporting the weight on the load frame 30 from the bed support frame 11.

As indicated in FIG. 4 each transformer 37 is mounted on the same side of the bed. In addition, each transformer 37 is connected via a suitable electrical line or cable 45 to a central control box 46 mounted for example, on the patient support section to summarize the transformer signals. The control box 46 is, in turn, connected via a suitable electrical line 47 to an output 48 in order to emit a signal corresponding to the summarized signals as a measurement of a load on the load frame 30.

Referring to FIGS. 3 and 5, the load frame 30 of the scale assembly 14 includes a pair of upstanding L-shaped brackets 49 formed o a vertical plate 49, secured, as by welding, to a transverse beam 33 at the head end o the bed 10 and a horizontally disposed plate 50 which is provided with an aperture 51. Each aperture 51 is aligned with a corresponding aperture 52 in a link 22 and a bolt 53 passes through the aligned apertures 51, 52 and cooperates with a nut 54 and washer 55 to pivotally secure each link 22 to a plate 50. In this way, the head end of the patient support section 12 is pivotally mounted on the load frame 30 of the scale assembly 14.

A pair of elongated L-shaped brackets 56 is also secured to the transverse beam 33 at tee foot end of the bed 10 to pivotally and slidably receive the links 22 thereat. Each bracket 56 has a horizontally disposed inverted U-shaped arm 57 with a horizontally disposed slot 58 in one depending leg. The opposite depending leg is provided with a circular aperture 59 in alignment with the slot 58 for passage of a bolt 60 therethrough. In this respect, the aperture 59 is larger than the bolt 60 in order to permit access to the slot 58. Each bolt 60 cooperates with a threaded nut 61 and washer 62 in order to pivotally secure a link 22 to the slotted arm of the bracket 56. In this respect, each washer 62 passes through a link 22 to permit sliding within a respective slot 58 to permit raising and lowering of the foot of the bed independently of the head of the bed. Such an arrangement is generally conventional and need not be further described.

Referring to FIG. 3, in order to mount the scale assembly 14 in an existing bed, relatively few operations are required First, the existing brackets of the bed to which the links 22 are pivotally connected are removed. Thereafter, the support bars 24 of the scale assembly are mounted on the transverse beams 17 of the bed support frame 11 via the plate 26 and bolts 25. With the scale assembly thus mounted on the bed support frame 11, each link 22 can be pivotally connected to the respective brackets 49, 56. After suitable calibration of the transformers 37, the scale assembly 14 is ready for use.

Once the scale assembly 14 has been integrated within the bed 10, the load frame 30 acquires four pickup points at the four previous lug positions.

As indicated in FIG. 3, since the weight of the patient support section 12 is carried directly on the load frame 30 of the scale assembly 14, a weight reading may be taken for any position of the patient support section 12 relative to the bed support frame 11. There is no need to move the patient support section 12 into a set position relative to the bed support frame 11.

As indicated in FIG. 1, the output 48 can be plugged into a suitable readout means such as a pole mounted digital display 63.

Generally, in order to enhance the accuracy of a weighing, the wheels 18 of the bed support frame 11 are turned into parallel relationship with each other so as to reduce the deflection of the bed support frame 16 under a load.

Referring to FIGS. 3 and 5, in order to limit horizontal excursion of the movable components of the scale assembly, the respective brackets 49, 56 are provided with adjustable stops 64, 65. As indicated, each stop 64,65 includes a threaded bolt 66, 67 which can be adjusted in order to abut against a transverse beam 17 of the bed support frame 11. Also, as indicated in FIG. 5, a pair of plates 68 each having a slot 69 is mounted on a rail 31 of the load frame 20 via a pair of bolts 70 in order to limit sidewise movement of the transformer cores 40. To this end, each slot 69 envelopes a portion of the bracket assembly 41 (see FIG. 6).

Referring to FIG. 2, stops 71 may also be secured to the support bars 24 of the scale assembly 14 to limit outward excursions of the load frame 30.

The various stops serve to act as bumpers which limit horizontal forces acting on the bed from injuring the scale flexures 32. The integration of the scale assembly 14 with the bed 10 occurs without any interference with the normal bed functions, i.e. an up-down motion, head tilting and/or foot tilting.

The invention thus provides a relatively compact construction of bed and scale assembly as well as one which is of low cost, cost-efficient nature which permits weighing of a bed-ridden patient in any bed position.

The invention further provides a scale assembly which can be readily integrated into existing hospital beds and which can be readily removed from a hospital bed for maintenance purposes, if required.

What is claimed is:

1. In combination
   a bed support frame;
   a patient support section;
   a linkage system connected to said patient support section for movably mounting said section on said support frame; and
   a scale assembly mounted on said support frame and connected between and to said support frame and said linkage system for weighing of said patient support section with a bed-ridden patient thereon.

2. The combination as set forth in claim 1 wherein said scale assembly includes a pair of support bars secured to said bed support frame, a load frame connected to said linkage system, flexure means connecting said load frame to said support bars to permit movement therebetween and means for sensing a movement of said load frame as a measure o a weight thereon.

3. The combination as set forth in claim 2 wherein said linkage system includes a parallelogram arrangement of links pivotally connected to and between said patient support section and said load frame.

4. The combination as set forth in claim 3 which further comprises two pairs of brackets secured in vertically disposed manner on said load frame with respective links pivotally connected thereto.

5. The combination as set forth in claim 4 wherein each bracket of one of said pairs of brackets is of L-shape with a horizontally disposed U-shaped arm having a horizontally disposed slot in one depending leg of said arm and an aperture in a second depending leg of said arm in alignment with said slot and which further comprises a bolt passing through said slot of each L-shaped bracket and a respective link.

6. In combination
   a bed support frame;
   a scale assembly including a pair of support bars mounted on and within said bed support frame and a load frame movably mounted relative to said support bars;
   a patient support section mounted on said load frame for imposing a load thereon; and
   means for moving said patient support section relative to said bed support frame.

7. The combination as set forth in claim 6 wherein said means includes a parallelogram arrangement of links for vertically moving said patient support section relative to said bed support frame.

8. The combination as set forth in claim 7 which further comprises two pairs of brackets secured in vertically disposed manner on said load frame with respective links pivotally connected thereto.

9. The combination as set forth in claim 8 wherein each bracket of one of said pair of brackets includes an elongated slot receiving a bolt secured to a respective one of said links to permit pivoting of one end of said patient support section relative to the opposite end thereof.

10. The combination as set forth in claim 6 wherein said scale assembly includes at least one displacement transmitting member connected between one of said support bars and said scale load frame for movement in response to a displacement of said scale load frame relative to said bed support frame and means for emitting a signal corresponding to movement of said displacement transmitting member.

11. The combination as set forth in claim 10 wherein said scale assembly includes a beam arm connected to said displacement transmitting member in cantilever manner, and wherein said means includes a transformer core mounted on said beam arm and a transformer coil mounted on said bed support frame about said core for emitting said signal therefrom.

12. The combination as set forth in claim 10 wherein said means is a linear variable differential transformer.

13. In combination
   a bed support frame;
   a scale assembly including a pair of support bars mounted on and within said bed support frame and a load frame movably mounted relative to said support bars; and
   a patient support section mounted on said load frame for imposing a load thereon.

14. The combination as set forth in claim 13 further includes a parallelogram arrangement of links connected to and between said patient support section and said load frame for vertically moving said patient support section relative to said bed support frame.

15. The combination as set forth in claim 14 which further comprises two pairs of brackets secured in vertically disposed manner on said load frame with respective links pivotally connected thereto.

16. The combination as set forth in claim 15 wherein each bracket of one of said pair of brackets includes an elongated slot receiving a bolt secured to a respective one of said links to permit pivoting of one end of said patient support section relative to the opposite end thereof.

* * * * *

UNITED STATES PATENT AND TRADEMARK OFFICE
CERTIFICATE OF CORRECTION

PATENT NO. : 4,793,428
DATED : Dec. 27, 1988
INVENTOR(S) : Burt L. Swersey

It is certified that error appears in the above-identified patent and that said Letters Patent is hereby corrected as shown below:

Column 2, line 68 "mean" should be --means--
Column 4, line 19 "o" should be --of--
Column 4, line 19 "49", second occurrence, should be -- 49' --.
Column 4, line 21 "o" should be --of--
Columm 4, line 30 "tee" should be --the--
Column 5, line 55 "o" should be --of--

Signed and Sealed this

Eighteenth Day of July, 1989

Attest:

DONALD J. QUIGG

Attesting Officer

Commissioner of Patents and Trademarks